(12) United States Patent
Johnson et al.

(10) Patent No.: US 7,640,707 B2
(45) Date of Patent: Jan. 5, 2010

(54) FASTENING CLIP

(75) Inventors: Lawrence W. Johnson, Taylor, MI (US); Brian M. Parisi, Macomb, MI (US)

(73) Assignee: Illinios Tool Works Inc., Glenview, IL (US)

( * ) Notice: Subject to any disclaimer, the term of this patent is extended or adjusted under 35 U.S.C. 154(b) by 235 days.

(21) Appl. No.: 11/653,157

(22) Filed: Jan. 12, 2007

(65) Prior Publication Data

US 2007/0251176 A1    Nov. 1, 2007

Related U.S. Application Data

(60) Provisional application No. 60/792,714, filed on Apr. 18, 2006.

(51) Int. Cl.
*E04B 2/30* (2006.01)
*E04C 2/38* (2006.01)
*E04F 19/02* (2006.01)
*F16B 19/00* (2006.01)

(52) U.S. Cl. .............. 52/489.2; 52/718.03; 52/489.1; 24/295; 411/508; 411/510

(58) Field of Classification Search .............. 52/718.03, 52/718.06, 489.1, 489.2, 698; 24/293, 294, 24/295, 453, 297, 289, 291, 458, 292; 411/508, 411/509, 510, 913
See application file for complete search history.

(56) References Cited

U.S. PATENT DOCUMENTS

| | | | | |
|---|---|---|---|---|
| 562,491 A * | 6/1896 | Schoup | ............ | 16/417 |
| 1,374,713 A * | 4/1921 | Bell | ............ | 411/338 |
| 1,978,935 A * | 10/1934 | Douglas | ............ | 411/80.2 |
| 2,006,813 A * | 7/1935 | Powers | ............ | 411/352 |
| 2,201,335 A * | 5/1940 | Cotter | ............ | 24/293 |
| 2,249,902 A | 7/1941 | Kral | | |
| 2,391,298 A * | 12/1945 | Davis | ............ | 411/508 |
| 2,511,512 A * | 6/1950 | Poupitch | ............ | 411/508 |
| 2,537,786 A * | 1/1951 | Poupitch | ............ | 411/508 |
| 2,560,961 A * | 7/1951 | Knohl | ............ | 411/173 |
| 2,584,812 A * | 2/1952 | Poupitch | ............ | 411/508 |
| 2,596,940 A * | 5/1952 | Poupitch | ............ | 411/508 |
| 2,650,516 A * | 9/1953 | Poupitch | ............ | 411/508 |
| 2,788,047 A * | 4/1957 | Rapata | ............ | 411/182 |
| 2,885,754 A * | 5/1959 | Munse | ............ | 24/293 |
| 2,961,723 A | 11/1960 | Hamman | | |
| 3,213,745 A * | 10/1965 | Dwyer | ............ | 411/15 |
| 3,213,746 A * | 10/1965 | Dwyer | ............ | 411/15 |
| 3,220,078 A * | 11/1965 | Preziosi | ............ | 411/349 |

(Continued)

FOREIGN PATENT DOCUMENTS

JP     2000318657     11/2000

(Continued)

*Primary Examiner*—Robert J Canfield
*Assistant Examiner*—Babajide Demuren
(74) *Attorney, Agent, or Firm*—Mark W. Croll; Paul F. Donovan

(57) ABSTRACT

A fastening clip configured to secure a first panel to a second panel may include a base supporting a plurality of resilient beams, and a plurality of tangs outwardly extending from an outer surface of each of the resilient beams. The plurality of tangs are configured to securely engage the first and/or second panels. The fastening clip may also include stabilizing flaps on either side.

10 Claims, 2 Drawing Sheets

U.S. PATENT DOCUMENTS

| | | | | |
|---|---|---|---|---|
| 3,272,059 | A * | 9/1966 | Lyday et al. | 411/510 |
| 3,350,976 | A * | 11/1967 | Topf | 411/502 |
| 3,481,242 | A * | 12/1969 | Topf | 411/502 |
| 3,611,861 | A * | 10/1971 | Schulze | 411/508 |
| 3,795,890 | A * | 3/1974 | Van Buren, Jr. | 439/801 |
| 3,905,570 | A * | 9/1975 | Nieuwveld | 248/71 |
| 4,122,583 | A | 10/1978 | Grittner et al. | |
| 4,179,975 | A * | 12/1979 | Forcina | 411/448 |
| 4,622,725 | A * | 11/1986 | Bumgardner | 24/453 |
| D298,736 | S * | 11/1988 | Shiraishi | D8/388 |
| 4,787,795 | A * | 11/1988 | Kraus | 411/510 |
| 4,920,618 | A * | 5/1990 | Iguchi | 24/453 |
| 4,973,212 | A * | 11/1990 | Jacobs | 411/508 |
| 5,007,779 | A * | 4/1991 | Goran | 411/48 |
| 5,288,530 | A | 2/1994 | Maki | |
| 5,592,719 | A | 1/1997 | Eto et al. | |
| 5,676,351 | A * | 10/1997 | Speece et al. | 256/54 |
| 5,774,949 | A | 7/1998 | Cornell et al. | |
| 5,906,465 | A * | 5/1999 | Sato et al. | 411/510 |
| 5,907,891 | A * | 6/1999 | Meyer | 24/453 |
| 6,364,589 | B1 * | 4/2002 | Wenglinski | 411/508 |
| 6,381,811 | B2 | 5/2002 | Smith et al. | |
| 6,406,236 | B1 * | 6/2002 | Olson, Jr. | 411/61 |
| 6,406,242 | B1 * | 6/2002 | Gordon | 411/508 |
| 6,453,522 | B1 * | 9/2002 | Romero Magarino et al. | 24/458 |
| 6,594,870 | B1 | 7/2003 | Lambrecht et al. | |
| 6,662,411 | B2 | 12/2003 | Rubenstein et al. | |
| 6,715,185 | B2 | 4/2004 | Angellotti | |
| 6,719,513 | B1 * | 4/2004 | Moutousis et al. | 411/510 |
| 6,769,849 | B2 * | 8/2004 | Yoneoka | 411/45 |
| 6,952,863 | B2 | 10/2005 | Draggoo et al. | |
| 6,976,292 | B2 * | 12/2005 | MacPherson et al. | 24/293 |
| 7,073,231 | B2 | 7/2006 | Draggoo et al. | |
| 7,114,221 | B2 | 10/2006 | Gibbons et al. | |
| 7,120,971 | B2 | 10/2006 | Osterland et al. | |
| 7,198,315 | B2 * | 4/2007 | Cass et al. | 296/29 |
| 7,415,752 | B2 * | 8/2008 | De Azevedo et al. | 24/295 |
| 2004/0244158 | A1 * | 12/2004 | Awakura et al. | 24/458 |
| 2005/0169726 | A1 * | 8/2005 | McClure | 411/55 |
| 2006/0042053 | A1 * | 3/2006 | Kawai | 24/297 |
| 2007/0137004 | A1 * | 6/2007 | Baekelandt | 24/289 |

FOREIGN PATENT DOCUMENTS

JP  2001277985  10/2001

* cited by examiner

FASTENING CLIP

RELATED APPLICATIONS

This application relates to and claims priority benefits from U.S. Provisional Patent Application No. 60/792,714 entitled "Fastening Clip," filed Apr. 18, 2006, which is hereby incorporated by reference in its entirety.

FIELD OF THE INVENTION

Embodiments of the present invention generally relate to fastening clips, and more particularly, to fastening clips that are configured to securely retain panels in multiple locations.

BACKGROUND OF THE INVENTION

One type of conventional fastening clip is configured to secure two panels, sheets, beams, or other such members together. For example, a head portion of the fastening clip is securely positioned through a mating opening formed in a first panel. A second panel may then be secured to the fastening clip, which is secured to the first panel. Thus, the first and second panels may be secured together.

FIG. 1 illustrates an isometric view of a conventional fastening clip 10 secured to a first panel 12, such as a trim panel of a vehicle. The fastening clip 10 includes a plastic insert 11 configured to be slid into position with respect to the panel 12. In order to secure the fastening clip 10 to the panel 12, the insert 11 is positioned through a hole 14 formed in the panel 12. For example, the insert 11 may be slid into position within the hole 14. To ensure a snug fit against a second panel (not shown), an annular foam insert 16 is slid over a head portion 18 of the insert 11. The foam insert 16 may snapably secure into a groove (not shown) formed proximate the head portion 18. The foam insert 16 is configured to be compressively urged into the second panel. As such, the foam insert 16 acts as a brace that prevents the first panel 12 and the second panel from shifting, wobbling, or otherwise moving with respect to one another once the second panel is secured to the first panel 12 by way of the fastening clip 10.

In order to securely engage the second panel, the fastening clip 10 is typically inserted to a depth through the second panel that allows the foam insert 16 to securely abut the second panel. For example, the fastening clip 10 typically passes into the second panel such that the foam insert 16 effectively pushes the second panel into a locking feature formed in or on the fastening clip 10. A manufacturer or installer typically needs to ensure that the fastening clip 10 is properly positioned with respect to the panels in order to ensure proper fastening engagement. Additionally, the manufacturer or installer also needs to account for the separate and distinct components of the fastening clip 10, that is, the plastic insert 11 and the foam insert 16.

Thus, a need exists for a fastening clip that securely and efficiently secures panels together.

SUMMARY OF THE INVENTION

Certain embodiments of the present invention provide a fastening clip configured to secure a first panel to a second panel. The fastening clip may include a base supporting a plurality of resilient beams, and a plurality of tangs outwardly extending from an outer surface of each of the resilient beams. The plurality of tangs are configured to securely engage at least one of the first and second panels. Each of said plurality of resilient beams may include a chamfered distal tip. The plurality of tangs may extend over at least a portion of a length (or height, depending on the orientation) of each of the resilient beams.

The base may be integrally connected to the plurality of resilient beams through a reduced panel securing portion defining a notch. The first panel is configured to snapably secure into the notch.

Each beam may also include a flap on either side. The flap extends over at least a portion of a length (or height, depending on the orientation) of each of the resilient beams.

Certain embodiments of the present may provide an assembly, including a first panel, a second panel, and a one-piece fastening clip. The fastening clip may be positioned through holes formed through the panels, and secures the first panel to the second panel.

Certain embodiments provide a fastening clip, configured to secure a first panel to a second panel, that includes a base supporting at least one resilient beam, and an inwardly angled flap on either side of the resilient beam. The inwardly angled flaps provide stability to the beam. Each flap extends from a distal tip of the beam over at least a portion of a length of the beam.

Figure 1:
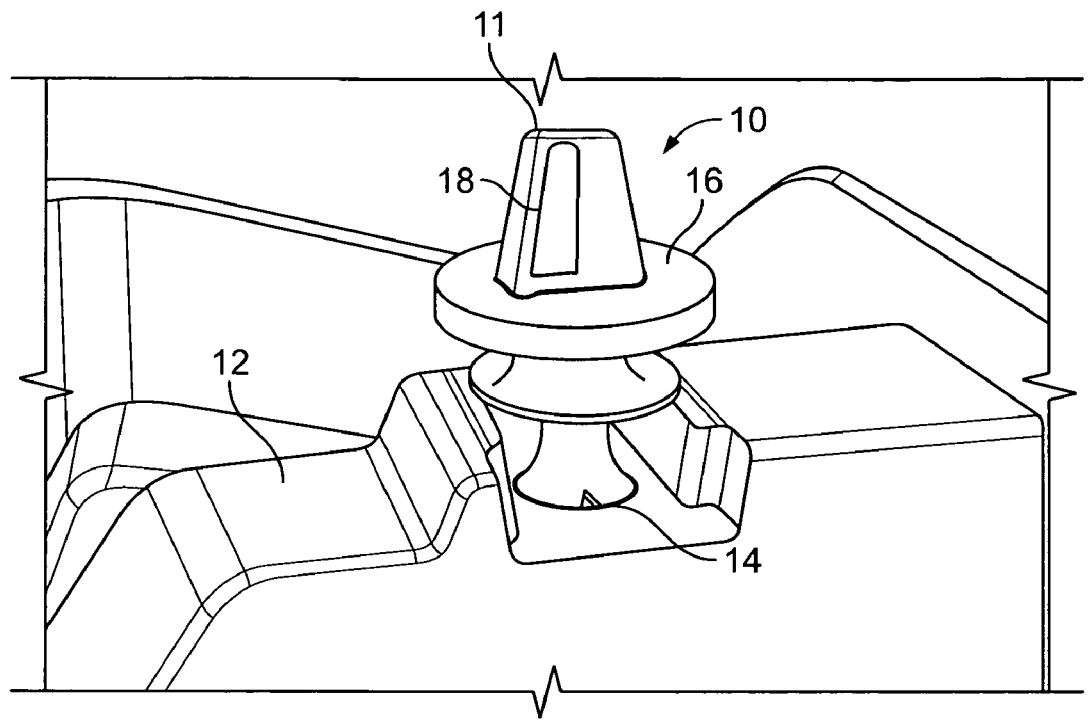
FIG. 1 illustrates an isometric view of a conventional fastening clip secured to a first panel.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 2:
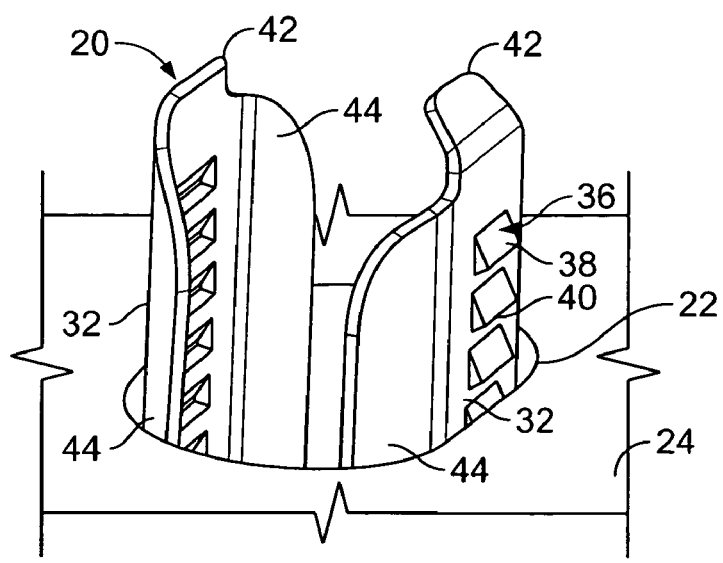
FIG. 2 illustrates an isometric view of a fastening clip positioned through a hole formed in a panel according to an embodiment of the present invention.
Figure 3:
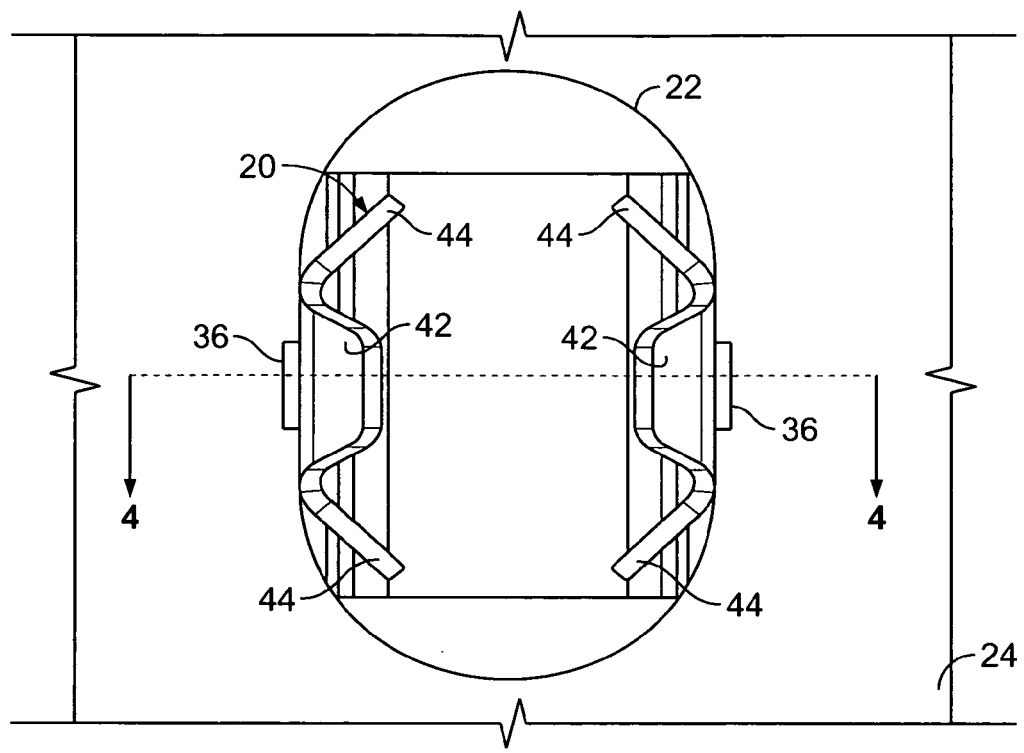
FIG. 3 illustrates a top plan view of a fastening clip positioned through a hole formed in a panel according to an embodiment of the present invention.
Figure 4:
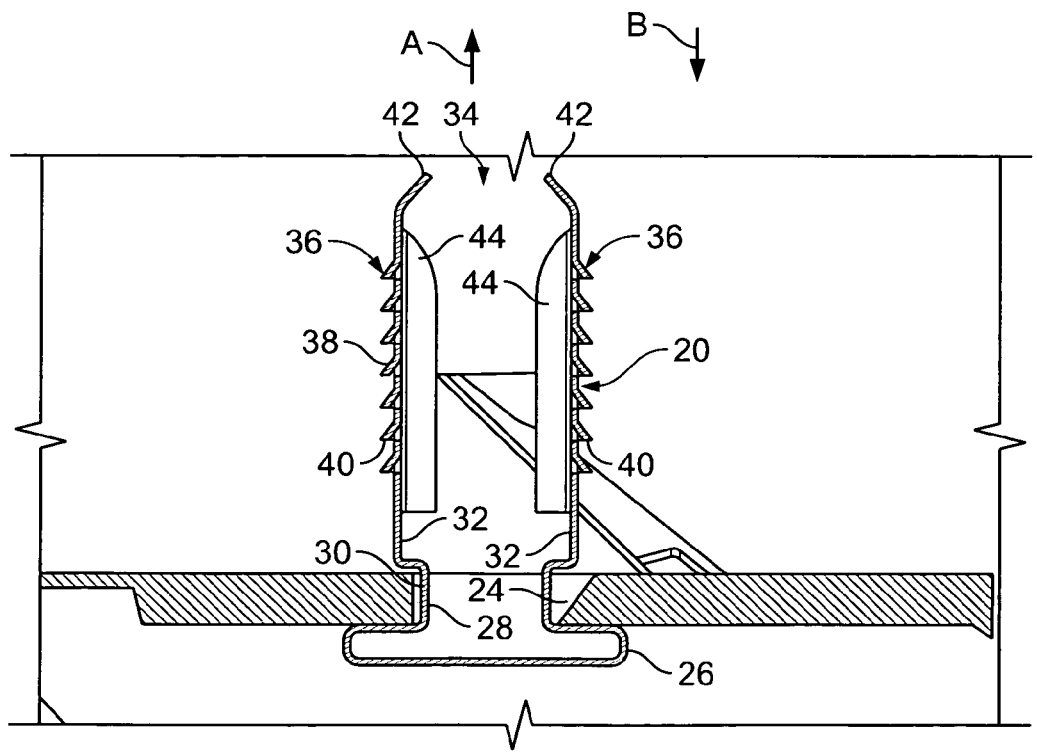
FIG. 4 illustrates a cross-sectional view of a fastening clip positioned through a hole formed in a panel through line 4-4 of FIG. 3.

FIG. 2 illustrates an isometric view of a fastening clip 20 positioned through a hole 22 formed in a panel 24 according to an embodiment of the present invention. FIG. 3 illustrates a top plan view of the fastening clip 20 positioned through the hole 22 formed in the panel 24. FIG. 4 illustrates a cross-sectional view of the fastening clip 20 positioned through the hole formed in the panel 24 through line 4-4 of FIG. 3. Referring to FIGS. 2-4, the fastening clip 20 may be formed of metal, plastic, or various other suitable materials. The fastening clip 20 may be, for example, an integrally formed piece of fabricated metal configured to secure panels, such as trim and body panels of a vehicle, together.

Referring to FIG. 4, in particular, the fastening clip 20 includes a base 26 integrally connected to a reduced panel securing portion 28 defining a notch 30. The outer circumference or perimeter of the reduced panel securing portion 28 is less than that of the base 26. The reduced panel securing portion 28 is, in turn, integrally connected to upright resilient arms or beams 32. Two opposed beams 32 are spaced apart by a gap 34. Thus, the beams 32 may flex toward one another if sufficient force is applied. The outer surfaces of each beam 32 include a plurality of vertically oriented tangs 36. The tangs 36 are ramped, or toothed members. Each tang 36 includes a downwardly sloped ramp 38 that abruptly connects to a lower edge 40. Distal tips 42 of the beams 32 are chamfered toward one another. While two beams 32 are shown, the fastening clip 20 may include more beams 32 than those shown. Additional beams 32 may provide additional fastening strength and a more robust fastening clip 20.

Each beam 32 also includes wings or flaps 44 along a substantial height of the beam 32 on either side thereof. Flaps 44 flank each beam 32. The flaps 44 angle inwardly toward the center of the fastening clip 20. The flaps 44 provide bracing support, thereby adding stability to the beams 32 and the fastening clip 20. The flaps 44 are configured to cooperate with mating holes formed in panels. The flaps 44 assist in properly locating the beams 32 with respect to mating holes in that, upon insertion, act to direct the beams 32 toward the center of the mating holes.

While not shown, the fastening clip 20 may also include a foam insert, if desired. The foam insert may provide, for example, a seal or sound proofing.

In order to secure the fastening clip 20 to the panel 24, the fastening clip 20 is pushed into the hole 24 in the direction of arrow A. Optionally, the panel 24 may be urged toward the fastening clip 20 in the direction of arrow B. During this movement, the distal tips 42 move into the hole 22. The inwardly chamfered distal tips 42 allow the fastening clip 20 to easily pass into the hole 22. Because the distal tips 42 are inwardly chamfered, the distal tips 42 do not snag the area of the panel 24 that defines the hole 22. Rather, the inwardly chamfered distal tips 42 allow the fastening clip 20 to effectively self locate the fastening clip 20 into the hole 24. For example, if the fastening clip 20 is out of alignment with the hole 22, the inwardly chamfered distal tips 42 allow the fastening clip 20 to slide toward and into the hole 22.

As the fastening clip 20 continues to move into the hole 22, the area of the panel 24 that defines that hole 22 squeezes the distal tips 42 toward one another. Consequently, the beams 32 flex toward one another, and the fastening clip 20 moves into the hole 22. With continued movement of the fastening clip 20 in the direction of arrow A, the ramped portions 38 of the tangs 36 slide over the edges of the panel 24 that define the hole 22. In effect, the tangs 36 provide a ratchet-like mating surface. While the panel 24 may slide over the ramped portions 38 in the direction of arrow A, the straight lower edges prevent the panel 24 from retreating over the beams 32 in the direction of arrow B.

The fastening clip 20 continues to be moved in the direction of arrow A, until the reduced panel securing portion 28 encounters the edges of the panel 24 that define the hole 22. The edges of the panel 24 snap into the reduced panel securing portion 28. Thus, the reduced panel securing portion 28 snapably secures to the panel 24. The wide base 26 prevents the fastening clip 20 from further movement in the direction of arrow A. As the reduced panel securing portion 28 snapably secures to the panel 24, the beams 32 flex outwardly to their at rest position.

Referring to FIGS. 2-4, once the fastening clip 20 is secured to the panel 24, a second panel (like panel 24 shown in FIG. 2) may be securely connected to the panel 24 by way of the fastening clip 20. The second panel is urged onto the fastening clip 20 in the direction of arrow B. Optionally, the fastening clip 20 and the first panel 24 may be urged toward the second panel in the direction of arrow A.

Portions of the second panel that define a mating hole (not shown) may slide over the inwardly chamfered distal tips 42. As the second panel moves over the fastening clip 20, the tangs 36 securely engage the portion of the second panel that defines the hole. In particular, the lower edges 40 of the tangs 36 dig into the portion of the second panel that defines the hole. Because the lower edges 40 dig into the second panel, the second panel may be securely set at various heights or depths of the fastening clip 20. Each tang 36 includes lower edges 40 that securely dig into the second panel. Thus, the second panel may be securely fastened by the uppermost tangs 36. Further, the additional panel may continue to be moved relative to the fastening clip 20 in the direction of arrow B, such that other or additional tangs may securely engage the second panel. As such, a plurality of tangs 36 on both beams 32 may provide increased securing strength.

Thus, embodiments of the present invention provide a unitary fastening clip. The unitary fastening clip may securely fasten two panels together through a one-piece design, as compared to the multiple component design of the conventional fastening clip 10, shown in FIG. 1. The one-piece design eliminates the need for manufacturing and assembling additional components. Further, because the tangs 36 are disposed over a substantial height of the beams 32, the fastening clip 20 may securely engage a panel at various distances over the beams 32. Thus, in contrast to the fastening clip 10 shown and described with respect to FIG. 1, a manufacturer or installer does not need to ensure that the fastening clip 20 is positioned at a certain depth or height with respect to a panel.

Overall, embodiments of the present invention provide a fastening clip that securely and efficiently secures panels, sheets, or other such members together.

While various spatial terms, such as front, rear, upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that a front portion is a rear portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastening clip configured to secure a first panel to a second panel, the fastening clip comprising:
   a base supporting a plurality of resilient beams, said base being integrally connected to said plurality of resilient beams through a reduced panel securing portion defining a notch, such that the first panel is configured to snapably secure into said notch, wherein each of said plurality of resilient beams comprises a flap on either side thereof, each flap extending over at least a portion of a length of each associated plurality of resilient beams, and wherein each of said plurality of resilient beams comprises a distal tip, such that said plurality of resilient beams are configured to be spaced apart by a gap extending from said base through said distal tips so that said plurality of resilient beams are arranged in a non-overlapping manner; and a plurality of tangs outwardly extending from an outer surface of each of said plurality of resilient beams, said plurality of tangs configured to securely engage the second panel, said tangs being spaced apart from and distinctly separate from said notch so that when the first panel is secured in said notch, none of said tangs engage the first panel.

2. The fastening clip of claim 1, wherein each of said plurality of resilient beams comprises a chamfered distal tip.

3. The fastening clip of claim 1, wherein said plurality of tangs extend over at least a portion of a length of each of said plurality of resilient beams.

4. The fastening clip of claim 1, wherein said plurality of resilient beams comprises two opposed resilient beams.

5. The fastening clip of claim 1, wherein each of said plurality of tangs comprises a ramped surface integrally connected to an edge.

6. An assembly, comprising
a first panel having a first hole formed therethrough;
a second panel having a second hole formed therethrough; and
a one-piece fastening clip positioned through said first and second holes and securing said first panel to said second panel, said fastening clip comprising:
a base supporting resilient beams, said base being integrally connected to said resilient beams through a reduced panel securing portion defining a notch, such that said first panel is configured to snapably secure into said notch, wherein each of said resilient beams comprises a flap on either side thereof to stabilize said fastening clip, each flap extending over at least a portion of a length of each associated resilient beam, and wherein each of said resilient beams comprises a distal tip, such that said resilient beams are configured to be spaced apart by a gap extending from said base through said distal tips so that said resilient beams are arranged in a non-overlapping manner; and a plurality of tangs outwardly extending from an outer surface of each of said resilient beams, said plurality of tangs configured to securely engage the second panel, said tangs being spaced apart from and distinctly separate from said notch so that when the first panel is secured in said notch, none of said tangs engage the first panel.

7. The assembly of claim 6, wherein each of said resilient beams comprises a chamfered distal tip.

8. The assembly of claim 6, wherein said plurality of tangs extend over at least a portion of a length of each of said resilient beams.

9. The assembly of claim 6, wherein said resilient beams comprise two opposed resilient beams.

10. A fastening clip configured to secure a first panel to a second panel, the fastening clip comprising:
a base supporting two opposed resilient beams, said base being integrally connected to said resilient beams through a reduced panel securing portion defining a notch, wherein the first panel is configured to snapably secure into said notch;
an inwardly angled flap on each side of said resilient beams, said inwardly angled flaps providing stability to said resilient beams, each of said inwardly angled flaps extending from a inwardly chamfered distal tip of each said resilient beam over at least a portion of a length of each said resilient beam, such that said resilient beams are configured to be spaced apart by a gap extending from said base through said inwardly chamfered distal tips so that said resilient beams are arranged in a non-overlapping manner; and
a plurality of tangs outwardly extending from an outer surface of each said resilient beam, said plurality of tangs configured to securely engage the second panel, wherein said plurality of tangs extend over at least a portion of a length of each said resilient beam, said tangs being spaced apart from and distinctly separate from said notch so that when the first panel is secured in said notch, none of said tangs engage the first panel.

* * * * *